United States Patent Office 3,495,969
Patented Feb. 17, 1970

3,495,969
SUBSTITUTED NITROPYRIDINES AS
HERBICIDES
Patrick R. Driscoll, Fords, N.J., assignor to Mobil Oil
Corporation, a corporation of New York
No Drawing. Continuation-in-part of application Ser. No.
619,958, Mar. 2, 1967. This application Sept. 25, 1967,
Ser. No. 670,378
Int. Cl. A01n 9/22; C07d 31/40
U.S. Cl. 71—94                11 Claims

ABSTRACT OF THE DISCLOSURE

Substituted pyridines of the formula

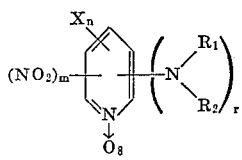

wherein $R_1$ and $R_2$ are selected from the group consisting of hydrogen, alkyl ($C_1$–$C_8$), cycloalkyl ($C_3$–$C_6$), alkoxy ($C_1$–$C_6$), phenyl, substituted phenyl, alkenyl ($C_2$–$C_8$), benzyl, and substituted benzyl or $R_1$ and $R_2$ taken with N is a heterocycle; X is a member of the group consisting of hydrogen, cyano, hydroxy, halogen, sulfoxide, sulfonic acid, sulfone, —$CON(R_2)_2$, carboxyl, haloalkyl, alkyl ($C_1$–$C_6$), haloalkoxy, alkoxy, aryl, aryloxy, haloaryloxy, carbalkoxy, carbonyl, thiol, thioalkoxy, alkylthio, arylthio, and haloarylthio; $m$ is 1 or 2; $n$ is at least 1; $q$ is 0 or 1; and $r$ is 0, 1 or 2 are pre- and post-emergent herbicides.

In the above, "heterocycle" will be understood to include moieties derived from piperidine, morpholine, aziridine and pyrrolidine.

Cross reference to related applications

The amino nitropyridines disclosed herein are more fully described in a copending application entitled Manufacture of Amino Nitropyridines, in the name of Harold A. Kaufman, having the Serial Number 619,941 and filed Mar. 2, 1967.

This application is a continuation-in-part of U.S. application Ser. No. 619,958, entitled Amino Nitropyridines as Herbicides, filed Mar. 2, 1967 and which has been abandoned.

BACKGROUND OF THE INVENTION

Field of the invention

This invention relates to a method for controlling plant growth. More particularly, it relates to the control of plant growth, especially of undesirable plants, with substituted nitropyridines.

Description of the prior art

As is well known to those familiar with this art, effective control of undesired vegetable governs, to a large degree, yields from food crops. When weeds and other unwanted plants are controlled, one source of competition for the available moisture, nutrients, sunlight, and the like is eliminated. Furthermore, effective control also increases the efficiency of maintenance along roadways and railroad tracks, near industrial buildings, along power lines rights-of-ways, and the like.

The problems associated with effective control of undesired plants in each of the named areas are quite different. For example, when treating crops, or land which is being prepared for crops, the herbicide chosen must be selective in its activity. That is, it must be able to kill weeds and other unwanted plants, but it must be harmless to the food crop plant growing or to be grown in the treated area. When treating certain other areas, such as under power lines, it may be desirable to kill all plant life, and a herbicide which is non-selective will be most useful.

Chemical herbicides are classified generally according to the type of activity possessed thereby. A given compound may possess more than one type of activity depending upon its mode of application and the rate at which it is applied. In addition, herbicides are usually classified as selective or non-selective pre-emergents or post-emergents. The former are applied to the soil before the seeds germinate, and to be effective, they must be in intimate contact with the seeds, or with the germinated seedlings. Since weed seeds will germinate closer to the ground than crop seeds, a non-selective pre-emergence herbicide can be effectively used if its penetration is limited to a depth above the crop seeds. Since this is not always possible, the most effective pre-emergence herbicide is one which is selective in its nature. If the selected compound will kill seed, germinating seed, and seedlings of undesirable plants without harm to the seed, germinating seed, and seedlings of the crop, there is no danger from over-penetration.

Post-emergence herbicides, on the other hand, are applied after the crop and weeds have attained substantial height. Generally speaking, if a compound is found to have post-emergence activity, it will not be selective. This is in keeping with the observation that, as a rule, herbicidally active compounds will not be selective in its action upon plant life.

The useful compounds of the invention may be prepared by processes which are well known in the art, or by the process as disclosed in the application mentioned in the cross reference. The art, for example, discloses that amino nitropyridines may be prepared from alkoxy nitropyridines and amines, or from the silver salt of hydroxy nitropyridines and amines. See Roczniki Chem., vol. 39(12), pages 1811–1817 (1965) (in Polish), abstracted in Chemical Abstracts, vol. 4, page 15,831 (1966).

Other references generally disclosing the pyridines useful in the method of the present invention, as well as processes for their preparation, are: British Patent 1,038,530, Ber., vol. 61B, pages 427–34 (1928), of Chemical Abstracts, vol. 22, page 1975 (1828); Bull. Acad. Polon. Sci. Ser. Sci. Chem., vol. 8(5) pages 219–222 (1960) (in German), of Chemical Abstracts, vol. 60, pages 9241 (1964); and Roczniki Chem., vol. 34, pages 465–474 (1960) (German summary), of Chemical Abstracts, vol. 54, page 24,704 (1960). None of these references, however, disclosed that amino nitropyridines possess herbicidal activity.

Summary of the invention

In accordance with the invention, a method is provided for controlling plant growth which comprises applying to said plant a growth controlling amount of a substituted nitropyridine of the formula:

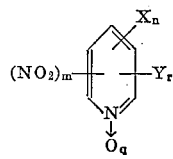

wherein:

Y is

in which $R_1$ and $R_2$ are selected from the group consisting of hydrogen, alkyl ($C_1$–$C_8$), cycloalkyl ($C_3$–$C_6$), alkoxy ($C_1$–$C_6$), phenyl, substituted phenyl, alkenyl ($C_2$–$C_8$), benzyl, and substituted benzyl;

$R_1$ and $R_2$ taken with N is a heterocycle;

X is a member of the group consisting of hydrogen, cyano, hydroxy, halogen, sulfoxide, sulfonic acid, sulfone, —$CON(R_2)_2$, carboxyl, haloalkyl, alkyl ($C_1$–$C_6$), haloalkoxy, alkoxy, aryl, aryloxy, haloaryloxy, carbalkoxy, carbonyl, thiol, thioalkoxy, alkylthio, arylthio, and haloarylthio;

$m$ is 1 or 2;
$n$ is at least 1;
$q$ is 0 or 1; and
$r$ is 0, 1 or 2.

In the above, "heterocycle" will be understood to include moieties derived from piperidine, morpholine, aziridine and pyrrolidine.

Description of specific embodiments

The nitropyridines of the present invention are stable and well-defined, and are particularly suited for herbicidal use when employed alone or in combination with inert carriers generally utilized in the herbicide art. The carrier adjuvants may be liquid or solid, depending upon the area to be treated, the type of plant to be controlled, and the kind of equipment available for application. When employing liquid formulations, they may be in the form of true solutions, dispersions, or emulsions containing, preferably, a small amount of a wetting agent. The compositions will contain a minor, herbicidal amount of compound and a major amount of the carrier therefor.

It is noted that the compounds useful in the invention are generally water insoluble, thus requiring an organic solvent when true solutions are desirable or necessary. Acetone, for example, can be used as the solvent. Other will be obvious to those skilled in the art, and need not be set forth herein.

When dispersions are used, the dispersive medium will generally be essentially aqueous, but it may contain small quantities of organic solvent, i.e., amounts not sufficient to cause solution of the active member, as well as a small amount of a wetting agent to aid in holding the particles in suspension.

The wetting agents referred to, in addition to aiding in suspending the toxic particles, are useful as aids in uniformly distributing the active material over the area to be treated. In other words, the wetting agent helps to prevent build-up of droplets on certain portions of the arta, whereupon other portions are left untouched or insufficiently treated by the toxicant. These agents are well known to the art and it would serve no useful purpose to enumerate them here. One example, however, of a useful wetting agent is Tween–20, a polyethylene sorbitan monolaurate.

Solid formulations contemplated may be dusts or granules containing herbicidal amounts of the disclosed nitropyridines. Many solids are known by the art to be useful as herbicidal carriers. Examples of these are kaolin, talc, kieselguhr, diatomaceous earth, pyrophyllite, bentonite, calcium carbonate, powdered cork, wood, walnut shells and peanut shells, fuller's earth, tricalcium phosphate, and the like. Formulations using these carriers may be prepared in known ways.

Additionally, the compounds useful in the invention may be applied as aerosols, in which case it is convenient to dissolve them in any suitable solvent and to disperse this solution in dichlorofluoromethane or other chlorofluoroalkanes having a boiling point below room temperature at ambient pressures. It is contemplated that other suitable materials boiling below room temperature will also be useful for this purpose.

The concentration of the chemicals in the compositions disclosed herein may vary over a wide range provided a herbicidal or toxic dosage thereof is placed upon the plant or in its immediate surroundings. Thus, the important consideration is not minimum and maximum concentrations, but the most economical concentration. The inventive herbicides are effective over the range of from about .25 pound to about 30 pounds of active ingredient per acre treated, and the most suitable ratio of carrier to active ingredient will be governed by the amount of carrier needed to give an even distribution of a growth controlling quantity of active material over the area under treatment.

In controlling undesirable plants with the disclosed chemicals as pre-emergents, the toxicant or compositions containing it may be sprayed (if a liquid) or spread (if a solid) over the ground. Thereafter, the material may be left to the natural action of rainfall, or it may be drenched or plowed and disked into the soil. When used as postemergents, a solid formulation may be dusted onto the plants by the same method used to apply other well known solid herbicidal compositions. When liquid sprays are employed to treat plants, the liquid composition may be sprayed thereon just to the point of liquid run-off.

Having described the invention in general terms, the following examples of the chemicals of this invention and their use as herbicides are offered. It will be understood that the examples given merely illustrate the invention by way of specific embodiments, and thus are not to be construed as limitation upon it.

In the examples, "parts" are parts by weight unless otherwise designated.

Example 1

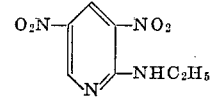

2-ethylamino-3,5-dinitropyridine

Ten parts (0.06 mole) of 2-ethylamino-5-nitropyridine was mixed with 75 ml. of concentrated sulfuric acid and the solution was cooled to below 5° C. A mixture of 4.4 parts (0.063 mole) of 90% fuming nitric acid and 25 ml. of concentrated sulfuric acid was added slowly to the stirred solution, maintaining the temperature below 5° C. After completion of the addition, the reaction mixture was stirred for one-half hour at about 5° C. whereupon the cooling bath was removed and stirring was continued for one hour. At the end of this time, the temperature was raised to 75° C. and was held there, with stirring, for five hours. Thereafter, the solution was cooled to room temperature, and then was poured over ice-water. The yellow solid which precipitated was filtered and recrystallized from ethanol. The yield was 41.7% of theory, and the melting point was 95–96° C. It contained 26.66% N (theory—26.41% N).

Example 2

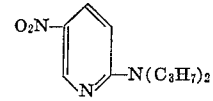

2-dipropylamino-5-nitropyridine

Thirteen parts (0.082 mole) of 2-chloro-5-nitropyridine was mixed with 160 parts of carbon tetrachloride and the mixture was heated to 55° C. to effect solution. 33.7 ml. (0.245 mole) of dipropylamine was added dropwise with stirring. After addition, the temperature was raised to 85° C. and the solution was stirred for six hours. The solution was then cooled and the solid dipropylamine hydrochloride was removed by filtration. The solvent was removed by distillation and the oily residue was steam distilled. The distillate was extracted with chloroform and the chloroform was dried over calcium sulfate. After drying, the solvent was stripped, leaving 4.3 parts, 23.5% of theory, of a yellow solid melting at 33.5–33.5° C. The product was found to contain 19.01% nitrogen (theory—18.82%).

Example 3

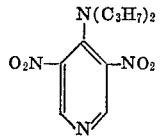

4-dipropylamino-3,5-dinitropyridine

Five parts (0.027 mole) of 3,5-dinitro-4-hydroxypyridine, 4 parts (0.04 mole) of dipropylamine and 0.1 part of p-toluene-sulfonic acid were mixed with about 175 parts of benzene in a flask fitted with a Dean-Stark trap. The mixture was refluxed for eight hours. The benzene was stripped, and a yellow solid was obtained. The solid was recrystallized from benzene, 7.2 parts, 51.4% of theory, of product was obtained, the solid melting at 123–126° C. It contained 21.59% N (theory—20.89%).

Example 4

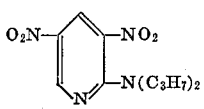

2-dipropylamino-3,5-dinitropyridine

The procedure of Example 3 was followed, except that 3,5-dinitro-2-hydroxypyridine was used in place of 4-hydroxypyridine of Example 3. 10.2 parts, 70% of theory, of product was obtained which melted at 191–195° C. It contained 20.45% N (theory—20.89%).

Example 5

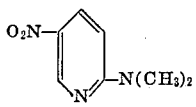

2-dimethylamino-5-nitropyridine

Fifteen parts (0.123 mole) of 2-dimethylaminopyridine was dissolved in 25 ml. of concentrated sulfuric acid while keeping the temperature below 5° C. A mixture of 11.2 ml. (0.27 mole) of fuming nitric acid and 5 ml. of concentrated sulfuric acid was added with stirring at a rate sufficient to keep the temperature below 5° C. Thereupon the mixture was stirred at 5° C. for three hours, then poured over 225 ml. of an ice-water mixture. The solution was made slightly basic with concentrated ammonium hydroxide, whereupon a yellow solid precipitated. Upon recrystallization from ethanol 6.3 parts (30.7% of theory) of product was obtained which melted at 148–151° C. The product contained 51.44% C. (theory—50.29%) and 5.48% H (theory—5.43%).

Example 6

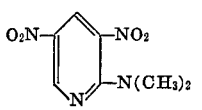

2-dimethylamino-3,5-dinitropyridine

Four parts (0.026 mole) of 2-dimethylamino-5-nitropyridine was dissolved in 90 ml. of concentrated sulfuric acid at 5° C. A mixture of 1.2 ml. (0.029 mole) of fuming nitric acid and 10 ml. of concentrated sulfuric acid was added with stirring at a rate sufficient to keep the temperature below 5° C. With continued stirring, the temperature was raised to 140–145° C. and maintained there for one hour, and then heated at 100° C. for five and a half hours. The solution was cooled and poured over ice, and was then neutralized with concentrated ammonium hydroxide 1.0 gram (18.2% of theory) of product melting at 120–122° C. was obtained. The product contained 26.96% N (theory—26.41%).

Example 7

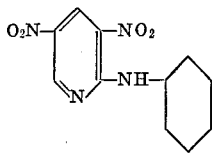

2-cyclohexylamino-3,5-dinitropyridine

Five parts (0.0246 mole) of 2-chloro-3,5-dinitropyridine was slurried with 25 ml. of ethanol. To this slurry was added, with good stirring, a mixture of 4.9 parts (0.0492 mole) of cyclohexylamine in 25 ml. of ethanol. The temperature rose to 50° C. and a yellow solid formed. An additional 25 ml. of ethanol was added and the mixture heated at 55° C. for 2 hours. The mixture was cooled and the yellow solid was filtered. 5.8 parts, a yield of 89.2% of product was obtained. The solid, recrystallized from ethanol, melted at 119–121° C.

Example 8

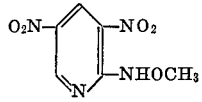

2-methoxyamino-3,5-dinitropyridine

Five parts (0.0246 mole) of 2 - chloro - 3,5 - dinitropyridine was slurried with 25 ml. of ethanol. 2.1 parts (0.0246 mole) of methoxyamine hydrochloride was dissolved in 10 ml. of ethanol and neutralized with 15 ml. of an ethanol-water solution of 1 part (0.0246 mole) sodium hydroxide. This solution was added to the slurry, a deep red color developed, and the temperature rose to 35° C. After stirring for 2 minutes, a yellow solid began to form. The mixture was stirred at room temperature for 16 hours. The yellow solid was filtered, yielding 4.4 parts of product (yield 83%). The solid recrystallized from ethanol, melted at 135° C.

Example 9

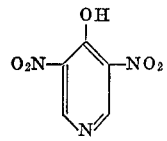

4-hydroxy-3,5-dinitropyridine

Thirty-seven parts of hydroxypyridine was added to 125 ml. of 30% fuming sulfuric acid at 30° C. The solution was cooled to 5° C. and 50 ml. of a mixture of fuming sulfuric acid and red fuming nitric acid (D=1.60) was added slowly at below 5° C. The mixture was then allowed to warm to 25° C., heated to 140° C. and held there for 16 hours. The reaction mixture was cooled and poured over ice, whereupon a white solid formed. Recrystallization of this solid from acetic acid gave 54.3 parts of product.

Example 10

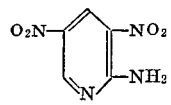

2-amino-3,5-dinitropyridine

Five parts (0.025 mole) of 2-chloro-3,5-dinitropyridine was slurried with ethanol (50 ml.). To this slurry was slowly added, with good stirring, 28% ammonium hydroxide (5 ml.). An orange color developed, the temperature rose to 47° C. and a yellow solid formed. The reaction mixture was allowed to stir at 25° C. for 16 hours and then the yellow solid was filtered. The solid weighed 4.4 parts, and represented a yield of 95.7%. The solid recrystallized from ethanol melted at 189–192.5° C. The product contained 30.82% N (theory—30.43%).

Following are additional compounds which fall within the scope of the invention, and which were prepared by the methods of the above examples as indicated.

TABLE I

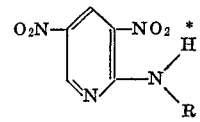

| Compound | R | Calculated, percent | | Found, percent | |
|---|---|---|---|---|---|
| | | C | N | C | N |
| 1 | H | | | | |
| 2 | $CH_3$ | | 28.28 | | 28.90 |
| 3 | $n\text{-}C_3H_7$ | | 24.77 | | 24.60 |
| 4 | $i\text{-}C_3H_7$ | 42.48 | | 42.91 | |
| 5 | $n\text{-}C_4H_9$ | | 23.33 | | 23.48 |
| 6 | allyl | | 24.99 | | 25.01 |
| 7 | p-chlorophenyl | Melting points 181–183, 123–125, and 119–121° C., respectively. | | | |
| 8 | cyclopropyl | | | | |
| 9 | cyclohexyl | | | | |

*Prepared by methods shown in Example 1 or 6.

TABLE II

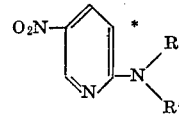

| Compound No. | R | R' | Calculated, percent | | | Found, percent | | |
|---|---|---|---|---|---|---|---|---|
| | | | C | H | N | C | H | N |
| 1 | H | $CH_3$ | | | 27.44 | | | 27.90 |
| 2 | H | $C_2H_5$ | | | | | | |
| 3 | H | $n\text{-}C_3H_7$ | | | 23.19 | | | 23.27 |
| 4 | H | $i\text{-}C_3H_7$ | | | 23.19 | | | 23.43 |
| 5 | H | $n\text{-}C_4H_9$ | | | 21.53 | | | 21.96 |
| 6 | H | allyl | | 5.06 | | | 5.09 | |
| 7 | $C_2H_5$ | $C_2H_5$ | 55.37 | 6.71 | | 55.95 | 6.71 | |
| 8 | H | phenyl | | | 19.53 | | | 20.06 |
| 9 | H | p-chlorophenyl | | | 16.83 | | | 17.30 |
| 10 | allyl | allyl | | | 19.15 | | | 19.85 |
| 11 | H | 3,4-dichlorophenyl | | | 15.39 | | | 15.20 |
| 12 | | piperidine | | 6.32 | | | 6.35 | |
| 13 | | morpholine | | | 20.09 | | | 20.35 |
| 14 | | pyrrolidine | | | 21.75 | | | 21.78 |

*Prepared by method of Example 2.

TABLE III

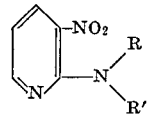

| Compound No. | R | R' | Calculated, percent | | | Found, percent | | |
|---|---|---|---|---|---|---|---|---|
| | | | C | H | N | C | H | N |
| 1 | H | $CH_3$ | | | 27.44 | | | 27.59 |
| 2 | H | $C_2H_5$ | | | 25.14 | | | 25.35 |
| 3 | H | $n\text{-}C_3H_7$ | | | 23.19 | | | 23.47 |
| 4 | H | $i\text{-}C_3H_7$ | | | 23.19 | | | 23.62 |
| 5 | H | $n\text{-}C_4H_9$ | 55.37 | | | 52.46 | | |
| 6 | H | allyl | | | 23.45 | | | 23.82 |
| 7 | $C_2H_5$ | $C_2H_5$ | | | 21.80 | | | 21.53 |
| 8 | $n\text{-}C_3H_7$ | $n\text{-}C_3H_7$ | 59.17 | 7.36 | | 59.13 | 7.36 | |
| 9 | H | p-Chlorophenyl | | | 16.83 | | | 17.29 |
| 10 | | pyrrolidine | 55.95 | | | 55.51 | | |
| 11 | | morpholine | | | 20.09 | | | 20.52 |
| 12 | | piperidine | | | 20.28 | | | 20.61 |

*Prepared by method of Example 2.

Other compounds which may be prepared by one or more of the methods mentioned herein, and which are further illustrative of the compounds within the scope of the invention, are the following:

TABLE IV

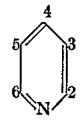

| Compound No. | Position No. | | | | |
|---|---|---|---|---|---|
| | 2 | 3 | 4 | 5 | 6 |
| 1 | Cl | $NO_2$ | $NHC_2H_5$ | $NO_2$ | |
| 2 | $NHC_2H_5$ | $NO_2$ | $OC_2H_5$ | $NO_2$ | |
| 3 | $NHC_2H_5$ | $NO_2$ | $CH_3SO_2$ | $NO_2$ | |
| 4 | $NHC_2H_5$ | $NO_2$ | | CN | |
| 5 | $NHC_2H_5$ | $NO_2$ | | $CH_3SO_2$ | |
| 6 | $NHC_2H_5$ | $NO_2$ | | $CF_3$ | |
| 7 | $NHC_2H_5$ | $NO_2$ | $NHC_3H_7$ | $NO_2$ | |
| 8 | $NHC_3H_7$ | $NO_2$ | $SC_3H_7$ | $NO_2$ | |
| 9 | $OC_2H_5$ | $NO_2$ | $NHC_2H_5$ | $NO_2$ | |
| 10 | $NHC_2H_5$ | $C_2H_5$ | | $NO_2$ | $CH_3$ |
| 11 | $NHC_2H_5$ | $CH_3SO$ | | $NO_2$ | |
| 12 | $NHC_2H_5$ | $CH_3\overset{O}{\overset{\|}{C}}O$ | | $NO_2$ | |
| 13 | $NHC_2H_5$ | $NO_2$ | | Cl | |
| 14 | $NHCH_3$ | Br | | $NO_2$ | |
| 15 | $N(CH_3)(OCH_3)$ | $NO_2$ | | Br | |
| 16 | $NHC_2H_5$ | $NO_2$ | | | $CH_3$ |
| 17 | $NHOCH_3$ | $C_2H_5$ | | $NO_2$ | $CH_3$ |
| 18 | $NHC_3H_7$ | CN | | $NO_2$ | |
| 19 | $NHC_3H_7$ | $CH_3\overset{O}{\overset{\|}{C}}-$ | | $NO_2$ | |
| 20 | $NHC_2H_5$ | $(C_2H_5)_2N\overset{O}{\overset{\|}{C}}$ | | $NO_2$ | |
| 21 | OH | $NO_2$ | | $NO_2$ | |
| 22 | | $NO_2$ | OH | $NO_2$ | |
| 23 | $SC_4H_9$ | $NO_2$ | | | |
| 24 | $S-\langle\text{C}_6\text{H}_4\rangle-Cl$ | $NO_2$ | | | |
| 25 | Cl | $NO_2$ | | $NO_2$ | |
| 26 | Cl | $NO_2$ | | $NO_2$ | |
| 27 | Br | $NO_2$ | | $NO_2$ | |
| 28 | $S-\langle\text{C}_6\text{H}_4\rangle-Cl$ | $NO_2$ | | $NO_2$ | |
| 29 | Cl | CN | | $NO_2$ | $CH_3$ |
| 30 | $NHC_2H_5$ | CN | | $NO_2$ | $CH_3$ |
| 31 | $NHC_2H_5$ | Br | | $NO_2$ | |
| 32 | $NHC_2H_5$ | $NO_2$ | | Br | |
| 33 | | $NO_2$ | $NHCH_3$ | | |
| 34 | | $NO_2$ | $NHC_2H_5$ | | |
| 35 | | $NO_2$ | $NHC_3H_7$ | | |
| 36 | | $NO_2$ | $NHC_4H_9$ | | |
| 37 | | $NO_2$ | $NHCH_3$ | $NO_2$ | |
| 38 | | $NO_2$ | $NHC_2H_5$ | $NO_2$ | |
| 39 | | $NO_2$ | $NHC_3H_7$ | $NO_2$ | |
| 40 | | $NO_2$ | $NHC_4H_9$ | $NO_2$ | |
| 41 | $O-\langle\text{C}_6\text{H}_4\rangle-Cl$ | $NO_2$ | | | |
| 42 | $O-\langle\text{C}_6\text{H}_3(Cl)\rangle-Cl$ | $NO_2$ | | | |
| 43 | $O-\langle\text{C}_6\text{H}_2(Cl)_2\rangle-Cl$ | $NO_2$ | | | |
| 44 | $O-\langle\text{C}_6\text{H}_4\rangle-Cl$ | $NO_2$ | | | |
| 45 | $O-\langle\text{C}_6\text{H}_4\rangle-Cl$ | | | $NO_2$ | |

TABLE IV—Continued

| Compound No. | Position No. | | | | |
|---|---|---|---|---|---|
| | 2 | 3 | 4 | 5 | 6 |
| 46 | 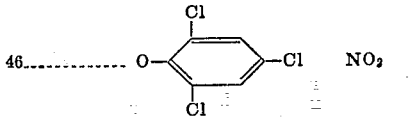 | NO₂ | | NO₂ | |
| 47 | 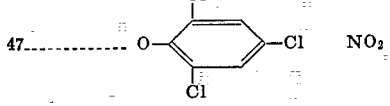 | NO₂ | | | |
| 48 | 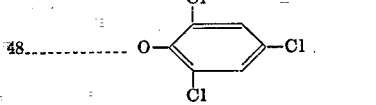 | | | NO₂ | |
| 49 | SC₂H₅ | NO₂ | | NO₂ | |
| 50 | OC₂H₅ | NO₂ | | NO₂ | |
| 51 | OCH₃ | NO₂ | | NO₂ | |
| 52 | 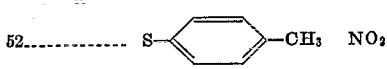 | NO₂ | | NO₂ | |
| 53 | | NO₂ | NH₂ | NO₂ | |

Herbicide tests

Pre- and post-emergence herbicide tests.—Method of propagating test species:

Crabgrass—*Digitaria sanguinalis*
Yellow foxtail grass—*Setaria glauca*
Johnson grass—*Sorghum halepense*
Barnyard grass—*Echinochloa crus-galli*
Amaranth pigweed—*Amaranthus retroflexus*
Turnip—*Brassica sp.*
Cotton—*Gossypium hirsutum* var. DPL smooth leaf
Corn—*Zea Mays*
Bean—*Phaseolus vulgaris* var. Black Valentine All crop and weed species were planted individually in 3″ plastic pots containing potting soil. Four seeds each of corn, cotton, and snapbeans were seeded to a depth equal to the diameter of the seed. All other species were surface seeded and sprinkled with screened soil in an amount sufficient to cover the seed. Immediately after planting, all pots were watered by sub-irrigation in greenhouse trays. Pots for the pre-emergence phase were seeded one day before treatment.

Planting dates for the post-emergence phase were varied so that all seedlings would reach the desired stage of development simultaneously. The proper stage of seedling development for treatment in the post-emergence phase is as follows:

Grasses.—2″ in height.
Pigweed and turnips.—1 or 2 true leaves above visible cotyledons.
Cotton.—First true leaf 1″ in length; expanded cotyledons.
Corn.—3″–4″ in height.
Beans.—Primary leaves expanded, growing point at primary leaf nodes.

Method of treatment

Compounds were tested at rates of application equivalent to 8 lbs. of actual compound per acre in a spray volume of 38 gallons per acre. Spray hood constants required to deliver the above volumes are as follows:
Belt speed.—2 m.p.h.
Air pressure.—Adjusted to provide 38 gal./per acre delivery.
Nozzle tip.—To provide uniform cross-section flat spray.

Formulations for spray applications were prepared in 50 ml. volumes with the following three components:
(1) 1.24 grams of compound (8 lbs./acre rate).
(2) 49 ml. acetone or acetone-water combination.
(3) 1 ml. of Tween-20.

Spray applications were made in a hood containing a removable belt and fixed spray nozzle. For passage through the spray hood, one pot of each specie (pre-emergence phase) was placed on the forward half of a wooden flat and one pot of established plants (post-emergence phase) was placed on the rear half of the flat. Treatments were removed to the greenhouse after spraying. Watering during the observation period was done only by sub-irrigation.

Method of recording results

Two weeks after treatment, pre- and post-emergence injury or control was visually rated, and the results were as shown in the following tables.

PRE-EMERGENCE ACTIVITY, PERCENT KILL

| Compound | Rate, lb./acre | CG | YF | JG | BG | PW | TP | CT | CN | BN |
|---|---|---|---|---|---|---|---|---|---|---|
| Example 1 | 8 | 90 | 90 | 90 | 90 | 90 | 50 | | 10 | 0 |
| Example 2 | 8 | 50 | 30 | 30 | | 90 | 0 | 0 | 0 | 0 |
| Example 3 | 8 | 30 | | 70 | 70 | 70 | 30 | | 0 | 0 |
| Example 5 | 8 | | | | | 30 | 40 | | 0 | 0 |
| Example 6 | 8 | 0 | 0 | 0 | 30 | 0 | 0 | 0 | 0 | 0 |

TABLE I

| Compound No.: | | | | | | | | | | |
|---|---|---|---|---|---|---|---|---|---|---|
| 1 | 8 | 90 | 90 | 80 | 90 | | 90 | 30 | 50 | 70 |
| 2 | 8 | 90 | 90 | 50 | 90 | | 90 | | | |
| 3 | 8 | 90 | 80 | 40 | 90 | | | | | |
| 5 | 8 | 90 | 60 | 40 | 80 | | | | | |
| 6 | 8 | 90 | 30 | | 30 | | 30 | | 40 | |

PRE-EMERGENCE ACTIVITY, PERCENT KILL—Continued

| Compound | Rate, lb./acre | CG | YF | JG | BG | PW | TP | CT | CN | BN |
|---|---|---|---|---|---|---|---|---|---|---|
| TABLE IV | | | | | | | | | | |
| Compound No.: | | | | | | | | | | |
| 21 | 8 | | | | | | 50 | | | |
| 22 | 8 | 30 | | | | | 90 | 30 | | |
| 23 | 8 | 30 | 40 | | | | 50 | | | |
| 24 | 8 | | 30 | | 30 | | | | | |
| 25 | 8 | | 40 | | | | 90 | | 30 | |
| 26 | 8 | | | | 50 | 50 | 30 | | | |
| 29 | 8 | | | | | | 60 | | 80 | 50 |
| 30 | 8 | | | | 30 | | 80 | 50 | | |
| 31 | 8 | 40 | | | 50 | 30 | 40 | | | |
| 32 | 8 | 90 | 50 | 90 | 80 | 30 | 90 | | 40 | |
| 37 | 8 | 50 | 50 | | | | 60 | | | |
| 38 | 8 | | 30 | 40 | 30 | | 30 | | 100 | |
| 39 | 8 | 30 | | | 70 | | | | | |
| 40 | 8 | 30 | | | 70 | | | | | |

POST-EMERGENCE ACTIVITY, PERCENT KILL

| Compound | Rate, lb./acre | CG | YF | JG | BG | PW | TP | CT | CN | BN |
|---|---|---|---|---|---|---|---|---|---|---|
| Example 1 | 8 | 100 | 90 | 90 | 100 | 100 | 90 | 100 | 30 | 100 |
| Example 2 | 8 | 80 | 60 | 90 | 70 | 90 | 90 | 70 | 60 | 90 |
| Example 3 | 8 | 30 | 30 | 30 | 30 | 90 | 80 | 40 | | 90 |
| Example 5 | 8 | 40 | 30 | 40 | | 30 | 80 | 40 | | |
| Example 6 | 8 | 60 | 60 | 30 | 50 | 90 | 30 | 50 | | 40 |

TABLE I

| Compound No.: | | | | | | | | | | |
|---|---|---|---|---|---|---|---|---|---|---|
| 1 | 8 | 100 | 80 | 70 | 80 | | 70 | 100 | 100 | 90 |
| 2 | 8 | 100 | 90 | 90 | 90 | | 100 | 100 | 50 | 100 |
| 3 | 8 | 100 | 80 | 80 | 80 | | 100 | 90 | 70 | 90 |
| 5 | 8 | 100 | 70 | 60 | 80 | | 90 | 90 | 50 | 70 |
| 6 | 8 | 100 | 90 | 90 | 90 | 100 | 100 | 70 | 100 | 60 |

TABLE IV

| Compound No.: | | | | | | | | | | |
|---|---|---|---|---|---|---|---|---|---|---|
| 21 | 8 | 70 | 30 | 40 | 40 | 30 | 50 | 30 | 30 | 30 |
| 22 | 8 | 40 | 30 | | | 90 | 80 | 40 | 30 | 50 |
| 23 | 8 | 90 | | | | | 60 | 30 | | 50 |
| 24 | 8 | 80 | | | | | 70 | 60 | | 80 |
| 25 | 8 | 100 | 40 | 50 | 50 | 40 | 50 | 90 | 40 | |
| 26 | 8 | 100 | 80 | | 80 | 90 | 90 | 90 | 30 | 80 |
| 29 | 8 | 80 | 30 | 30 | | 60 | 100 | 60 | | 50 |
| 30 | 8 | | 30 | 30 | | 40 | 40 | 50 | | 60 |
| 31 | 8 | 90 | 30 | 40 | 30 | 100 | 80 | 80 | 40 | 50 |
| 32 | 8 | 100 | 90 | 90 | 80 | 100 | 70 | 70 | 50 | 70 |
| 37 | 8 | 80 | 50 | 60 | 50 | 90 | 90 | 50 | 30 | 100 |
| 38 | 8 | 70 | 40 | 40 | 50 | 70 | 50 | 80 | 30 | 60 |
| 39 | 8 | 60 | 30 | 30 | 40 | 70 | 70 | 40 | 100 | 60 |
| 40 | 8 | 40 | 40 | 30 | 40 | 70 | 50 | 50 | 40 | 60 |

I claim:
1. A method of destroying a weed grass in its pre-emergence phase which comprises applying to said grass an effective amount of a substituted pyridine of the formula

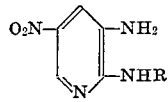

wherein R is hydrogen, lower alkyl, or allyl.

2. The method of claim 1 wherein the pyridine is present in a minor amount with a herbicide carrier therefor.

3. The method of claim 2 wherein the said herbicide carrier is a liquid.

4. The method of claim 2 wherein the said herbicide carrier is a solid.

5. The method of claim 1 in which the pyridine is

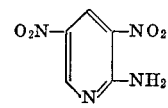

6. The method of claim 1 in which the pyridine is

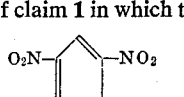

7. The method of claim 1 in which the pyridine is

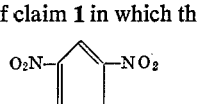

8. The method of claim 1 in which the pyridine is

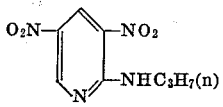

9. The method of claim 1 in which the pyridine is

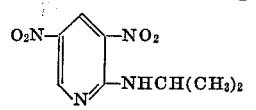

10. The method of claim 1 in which the pyridine is

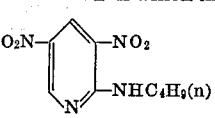

11. The method of claim 1 in which the pyridine is

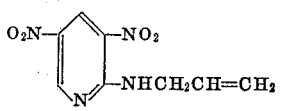

References Cited

UNITED STATES PATENTS

| 3,132,019 | 5/1964 | Soper | 71—94 |
| 3,257,190 | 6/1966 | Soper | 71—121 |
| 3,325,272 | 6/1967 | Hamaker et al. | 71—94 |
| 3,355,278 | 11/1967 | Weil et al. | 71—94 |

FOREIGN PATENTS 220,776    3/1959   Australia.

(Other references on following page)

OTHER REFERENCES

Berrie et al.: cited in Chem. Abst. 46, 8113–8114 (1952).
Moore et al.: cited in Chem. Abst. 55, 23134 (1961).
Suhr et al.: cited in Chem. Abst. 65, 7008–7009 (1966).
Talik.: cited in Chem. Abst. 54, 24,704—24,705 (1960).

LEWIS GOTTS, Primary Examiner
MELVYN KASSENOFF, Assistant Examiner

U.S. Cl. X.R.

260—239, 247, 247.1, 247.2, 247.5, 247.7, 290, 293, 293.4, 294, 294.3, 294.7, 294.8, 294.9, 295, 295.5, 296, 297; 71—88, 92

PO-1050
(5/69)

UNITED STATES PATENT OFFICE
CERTIFICATE OF CORRECTION

Patent No. 3,495,969     Dated February 17, 1970

Inventor(s) PATRICK R. DRISCOLL

It is certified that error appears in the above-identified patent and that said Letters Patent are hereby corrected as shown below:

Column 1, line 71, "rights-of-ways" should be read --rights-of-way--.
Column 2, line 46, "vol. 4" should be read --vol. 64--.
Column 2, line 51, "(1828)" should be read --(1928)--.
Column 3, line 43, "Other" should be read --Others--.
Column 3, line 56, "arta" should be read --area--.
Column 3, line 75, "chlorofluoroalkanes" should be read --chlorofluoroalkane--.
Column 5, line 8, "33.5-33.5°C." should be read --33.5-35.5°C.--.
Column 5, line 26, after "benzene" the comma (,) should be a period (.).
Column 10, Table IV, Compound 10, "$NHC_2H_3$" should be read --$NHCH_3$--.
Column 10, Table IV, Compound 45, "$NO_2$" should be in column under position 5.
Column 13, Post Emergence Table IV, Compound 32, Percent Kill for Corn should read --40-- instead of "50".

SIGNED AND
SEALED
JUL 21 1970

(SEAL)
Attest:

Edward M. Fletcher, Jr.
Attesting Officer

WILLIAM E. SCHUYLER, JR.
Commissioner of Patents